United States Patent
Jiang

(10) Patent No.: US 10,650,598 B2
(45) Date of Patent: May 12, 2020

(54) AUGMENTED REALITY-BASED INFORMATION ACQUIRING METHOD AND APPARATUS

(71) Applicant: Guangzhou UCWEB Computer Technology Co., Ltd., Guangzhou (CN)

(72) Inventor: Weizhong Jiang, Guangzhou (CN)

(73) Assignee: GUANGZHOU UCWEB COMPUTER TECHNOLOGY CO., LTD., Guangzhou (CN)

( * ) Notice: Subject to any disclaimer, the term of this patent is extended or adjusted under 35 U.S.C. 154(b) by 42 days.

(21) Appl. No.: 15/988,196

(22) Filed: May 24, 2018

(65) Prior Publication Data
US 2018/0342105 A1 Nov. 29, 2018

(30) Foreign Application Priority Data
May 25, 2017 (CN) .......................... 2017 1 0381173

(51) Int. Cl.
  *G06T 19/00* (2011.01)
  *G01S 19/42* (2010.01)
  *H04W 4/02* (2018.01)

(52) U.S. Cl.
  CPC .......... *G06T 19/006* (2013.01); *G01S 19/42* (2013.01); *H04W 4/023* (2013.01); *H04W 4/027* (2013.01)

(58) Field of Classification Search
  None
  See application file for complete search history.

(56) References Cited

U.S. PATENT DOCUMENTS

| | | | | |
|---|---|---|---|---|
| 2009/0289956 A1* | 11/2009 | Douris | ..................... | H04W 4/21 345/633 |
| 2012/0194554 A1* | 8/2012 | Kaino | .............. | G08B 13/19613 345/633 |
| 2013/0176337 A1* | 7/2013 | Lu | ........................... | G06F 3/011 345/633 |
| 2014/0204118 A1* | 7/2014 | Berry | ..................... | G06T 19/006 345/633 |
| 2014/0247281 A1* | 9/2014 | Ellenby | ................. | G06T 19/006 345/633 |
| 2016/0071149 A1* | 3/2016 | Farshori | ............. | G06Q 30/0253 705/14.51 |

(Continued)

*Primary Examiner* — David H Chu
(74) *Attorney, Agent, or Firm* — Alston & Bird LLP

(57) ABSTRACT

Provided is an augmented reality-based information acquiring method and apparatus. The method is applied to a mobile terminal, including: determining whether a distance between the mobile terminal and an augmented reality target is shorter than a preset distance according to the position, a moving speed and a moving direction of the mobile terminal; sending acquired current scenario information and augmented reality target information to a server by the mobile terminal, if the distance between the mobile terminal and the augmented reality target is shorter than the preset distance; receiving and using augmented reality to display information of a point of interest related to the augmented reality target sent by the server and the current scenario. The embodiments of the present application can use the augmented reality technology to acquire information of a point of interest related to an augmented reality target in real time.

15 Claims, 6 Drawing Sheets

(56) References Cited

U.S. PATENT DOCUMENTS

| | | | | |
|---|---|---|---|---|
| 2016/0171778 A1* | 6/2016 | Grossman | ............ | G06T 19/006 |
| | | | | 345/633 |
| 2016/0377381 A1* | 12/2016 | Lyren | ........................ | F41G 3/04 |
| | | | | 345/633 |
| 2018/0130244 A1* | 5/2018 | Liang | ...................... | G06T 11/60 |

* cited by examiner

AUGMENTED REALITY-BASED INFORMATION ACQUIRING METHOD AND APPARATUS

CROSS-REFERENCE TO RELATED APPLICATION

The present invention claims priority to and benefit of Chinese Patent Application No. 201710381173.6, filed with the State Intellectual Property Office (SIPO) of the People's Republic of China on May 25, 2017, the entire content of which is incorporated by reference into the present application.

TECHNICAL FIELD

Embodiments of the present application relate to the field of augmented reality technologies, and more specifically, to an augmented reality-based information acquiring method and an apparatus thereof.

PRIOR ART

Augmented reality is a novel technology that "seamlessly" integrates real world information with virtual world information, which simulates and then overlays real information originally difficult to experience in certain temporal and real world spatial ranges (visual information, sound, taste, touch, and the like) by using computer technologies and the like, thereby applying virtual information in the real world to be sensed by human senses and to achieve sensual experiences beyond reality. A real environment and a virtual object are overlaid in real time to be present simultaneously in the same image or space.

Augmented reality technologies not only present real-world information, but also display virtual information at the same time. The two types of information complement and are overlaid with each other. In a visualized augmented reality, a user uses a helmet display to synthesize the real world and multiple computer graphics and then can see real world surroundings.

According to the existing augmented reality technologies, a server stores information of Points Of Interest (POI), for example, longitude and latitude, transportation and restaurants in the surrounding area, and other hotel information. When a user mobile terminal is started to acquire a POI mark and uploads the acquired POI mark to a server, the server sends POI information corresponding to the POI mark to the mobile terminal, such as hotel reservation information, restaurant menus and prices, shopping mall discount information, 3D drawings of an internal structure of a vehicle, and the like. However, the user may not be familiar with the surrounding environment and is unable to acquire any POI mark of the scenario where the user is located. In this case, the user is unable to acquire POI information in real time.

Therefore, how to use augmented reality technologies to acquire POI information in real time related to an augmented reality target is a technical problem in urgent need of solving.

SUMMARY OF THE INVENTION

One of the technical problems to be solved by embodiments of the present application is to provide an augmented reality-based information acquiring method and an apparatus thereof, which can use augmented reality technologies to acquire, in real time, POI information related to an augmented reality target.

The embodiments of the present application provide an augmented reality-based information acquiring method, wherein the method is applied to a mobile terminal and comprises:

determining whether a distance between the mobile terminal and an augmented reality target is shorter than a preset distance according to the position, a moving speed, and a moving direction of the mobile terminal;

sending acquired current scenario information and augmented reality target information the to a server by the mobile terminal, if the distance between the mobile terminal and the augmented reality target is shorter than the preset distance; and receiving and using augmented reality to display POI information related to the augmented reality target sent by the server and the current scenario.

In a specific embodiment of the present application, the step of determining whether a distance between the mobile terminal and an augmented reality target is shorter than a preset distance according to the position, a moving speed and a moving direction of the mobile terminal comprises:

using a global positioning system to determine whether the distance between the mobile terminal and the augmented reality target is shorter than a preset distance, if the augmented reality target is a big target;

using a prestored navigation map to determine whether the distance between the mobile terminal and the augmented reality target is shorter than a preset distance, if the augmented reality target is a small target.

In a specific embodiment of the present application, the step of acquiring the moving speed comprises:

determining an initial moving speed of the mobile terminal according to a motion mode corresponding to a received user-inputted instruction; and/or, adjusting the initial moving speed according to a historical moving speed of the mobile terminal on a navigation route.

In a specific embodiment of the present application, the step of sending acquired current scenario information and augmented reality target information to a server by the mobile terminal, if the distance between the mobile terminal and the augmented reality target is shorter than the preset distance, comprises:

determining whether the mobile terminal is in a state that it can receive and display augmented reality content, if the distance between the mobile terminal and the augmented reality target is shorter than the preset distance;

sending the acquired current scenario information and augmented reality target information to a server, if the mobile terminal is in a state that it can receive and display augmented reality content.

In a specific embodiment of the present application, the step of sending the acquired current scenario information and augmented reality target information to a server, if the mobile terminal is in a state that it can receive and display augmented reality content, further comprises:

further sending user demand information to the server, if the mobile terminal is in a state that it can receive and display augmented reality content.

In a specific embodiment of the present application, the scenario information comprises at least one of scenario positioning parameter information, scenario marking object information, scenario marking object images, and user images.

In a specific embodiment of the present application, the step of receiving and using augmented reality to display POI information related to the augmented reality target sent by the server and the current scenario comprises:

receiving POI information related to the augmented reality target sent by the server;

performing augmented reality processing on the current scenario and the POI information related to the augmented reality target and displaying the same.

In a specific embodiment of the present application, the POI information comprises: promotional information corresponding to preference information acquired from historical behavior information of the user.

Corresponding to the above method, the present application further provides an augmented reality-based information acquiring apparatus, wherein the apparatus is implemented in a mobile terminal and comprises:

a distance determining module configured to determine whether a distance between the mobile terminal and an augmented reality target is shorter than a preset distance according to the position, a moving speed and a moving direction of the mobile terminal;

an information sending module configured to send acquired current scenario information and augmented reality target information to a server by the mobile terminal, if the distance between the mobile terminal and the augmented reality target is shorter than the preset distance; and a scenario displaying module configured to receive and use augmented reality to display information of a point of interest related to the augmented reality target sent by the server and the current scenario.

In a specific embodiment of the present application, the distance determining module comprises:

a big target determining unit configured to use a global positioning system to determine whether the distance between the mobile terminal and the augmented reality target is shorter than a preset distance, if the augmented reality target is a big target; and/or a small target determining unit configured to use a pre-stored navigation map to determine whether the distance between the mobile terminal and the augmented reality target is shorter than a preset distance, if the augmented reality target is a small target.

In a specific embodiment of the present application, the step of acquiring the moving speed comprises:

determining an initial moving speed of the mobile terminal according to a motion mode corresponding to a received user-inputted instruction; and adjusting the initial moving speed according to a historical moving speed of the mobile terminal on a navigation route.

In a specific embodiment of the present application, the information sending module comprises:

a state determining unit configured to determine whether the mobile terminal is in a state that it can receive and display augmented reality content, if the distance between the mobile terminal and the augmented reality target is shorter than the preset distance; and a target sending unit configured to send the acquired current scenario information and augmented reality target information to a server, if the mobile terminal is in a state that it can receive and display augmented reality content.

In a specific embodiment of the present application, the target sending unit further comprises:

a demand sending unit configured to further send user demand information to the server, if the mobile terminal is in a state that it can receive and display augmented reality content.

In a specific embodiment of the present application, the scenario information comprises at least one of scenario positioning parameter information, scenario marking object information, scenario marking object images, and user images.

In a specific embodiment of the present application, the scenario displaying module comprises:

an information receiving unit configured to receive POI information related to the augmented reality target sent by the server; and an information displaying unit configured to perform augmented reality processing on the current scenario and the POI information related to the augmented reality target and display the same.

In a specific embodiment of the present application, the POI information comprises: promotional information corresponding to preference information acquired from historical behavior information of the user.

In the embodiments of the present application, when the distance between the mobile terminal and an augmented reality target is shorter than the preset distance, the mobile terminal sends acquired current scenario information and augmented reality target information to a server. The server sends POI information related to the augmented reality target and the current scenario to the mobile terminal, and the mobile terminal uses augmented reality to display the current scenario and the POI information related to the augmented reality target. According to the embodiments of the present application, a user does not need to send a POI mark to the server, and POI information related to an augmented reality target can be acquired in real time just by the mobile terminal sending current scenario information to the server. Therefore, the present application is easier to use, displays richer scenarios, and better facilitates the implementation of augmented reality technologies.

BRIEF DESCRIPTION OF THE DRAWINGS

To more clearly describe technical solutions in the embodiments of the present application or the prior art, the accompanying drawings to be used in the description of embodiments or the prior art will be described briefly below. Apparently, the accompanying drawings described below are merely some embodiments of the present application. A person skilled in the art can further obtain other drawings according to these drawings without inventive effort.

DETAILED DESCRIPTION OF SPECIFIC EMBODIMENTS

Figure 1:
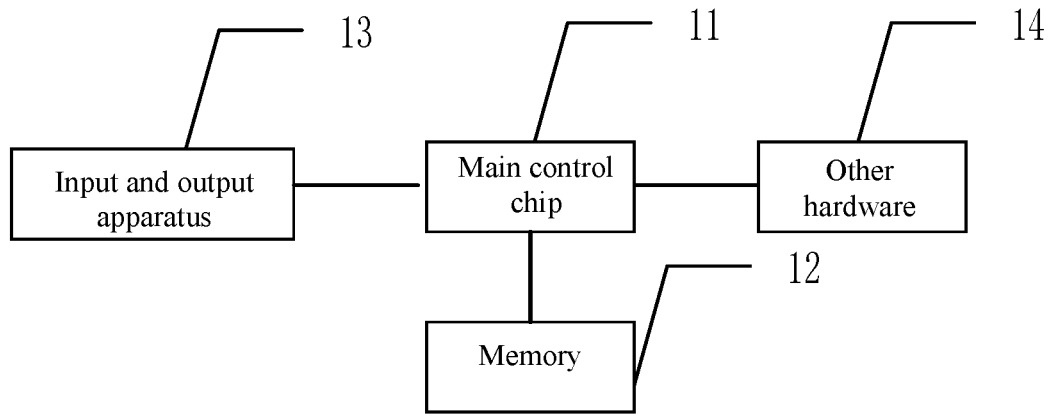
FIG. 1 is a hardware structural diagram of a computer device used in an embodiment of the present application.

In the embodiments of the present application, based on determining whether the distance between the mobile terminal and an augmented reality target is shorter than the preset distance, the mobile terminal sends acquired current scenario information and augmented reality target information to a server. The server sends POI information related to the augmented reality target and the current scenario to the mobile terminal, and the mobile terminal uses augmented reality to display the current scenario and the POI information related to the augmented reality target. According to the embodiments of the present application, a user does not need to send a POI mark to the server, and POI information related to an augmented reality target can be acquired in real time just by the mobile terminal sending current scenario information to the server. Therefore, the present application is easier to use, displays richer scenarios, and better facilitates the implementation of augmented reality technologies.

Although the present application can have many embodiments in various forms, particular embodiments are illustrated in the accompanying drawings and will be described in detail herein. It should be understood that the disclosure of such embodiments shall be deemed as examples of the principle, rather than an intention to limit the present application to the illustrated and described particular embodiments. In the following description, identical legends are used to describe identical, similar, or corresponding parts in several figures of the accompanying drawings.

As used herein, the term "one" or "one kind" is defined to be one (kind) or more than one (kind). As used herein, the term "multiple" is defined to be two or more. As used herein, the term "other" is defined to be at least one more or more than one more. As used herein, the term "contain" and/or "comprise" is defined to be including (i.e., an open term). As used herein, the term "coupling" is defined to be a connection, which is not necessarily a direct connection and not necessarily a connection in a mechanical manner. As used herein, the term "program," "computer program," or similar terms are defined to be an instruction sequence designed to be executed on a computer system. "Program" or "computer program" can include subroutines, functions, processes, object methods, object implementation, executable applications, applets, servlets, source codes, target codes, shared libraries/dynamic loading libraries and/or other instruction sequences designed to be executed on a computer system.

Throughout the file, the use of "one embodiment," "some embodiments," "embodiment," or similar terms indicate that particular features, structures, or characteristics described with reference to the embodiments are comprised in at least one embodiment of the present application. Therefore, the appearance of such terms throughout the description does not necessarily all indicate the same embodiment. In addition, the particular features, structures, or characteristics can be combined, without limitation, in any proper manner in one or more embodiments.

As used herein, the term "or" shall be interpreted as inclusive or indicative of any one or any combination. Therefore, "A, B, or C" indicates "any one of the following: A; B; C; A and B; A and C; B and C; A, B, and C." An exception of such definition only occurs when a combination of elements, functions, steps, or actions has inherent mutual rejection in a certain way.

To enable a person skilled in the art to better understand the technical solutions in the embodiments of the present application, the technical solutions in the embodiments of the present application will be clearly and completely described with reference to the accompanying drawings in the embodiments of the present application. Apparently, the embodiments to be described are merely some, rather than all, embodiments of the present application. All other embodiments obtainable by a person skilled in the art on the basis of the embodiments in the present application shall fall within the scope of the present application.

Specific implementation of the embodiments of the present application will be further described below with reference to the accompanying drawings in the embodiments of the present application.

An embodiment of the present application provides an augmented reality-based information acquiring method, which is applied to a mobile terminal, such as a cell phone, a PAD, and the like.

Referring to FIG. 1, the mobile terminal typically comprises a main control chip 11, a memory 12, an input and output apparatus 13, and other hardware 14. The main control chip 11 controls all functional modules, and the memory 12 stores application programs and data.

Figure 2:
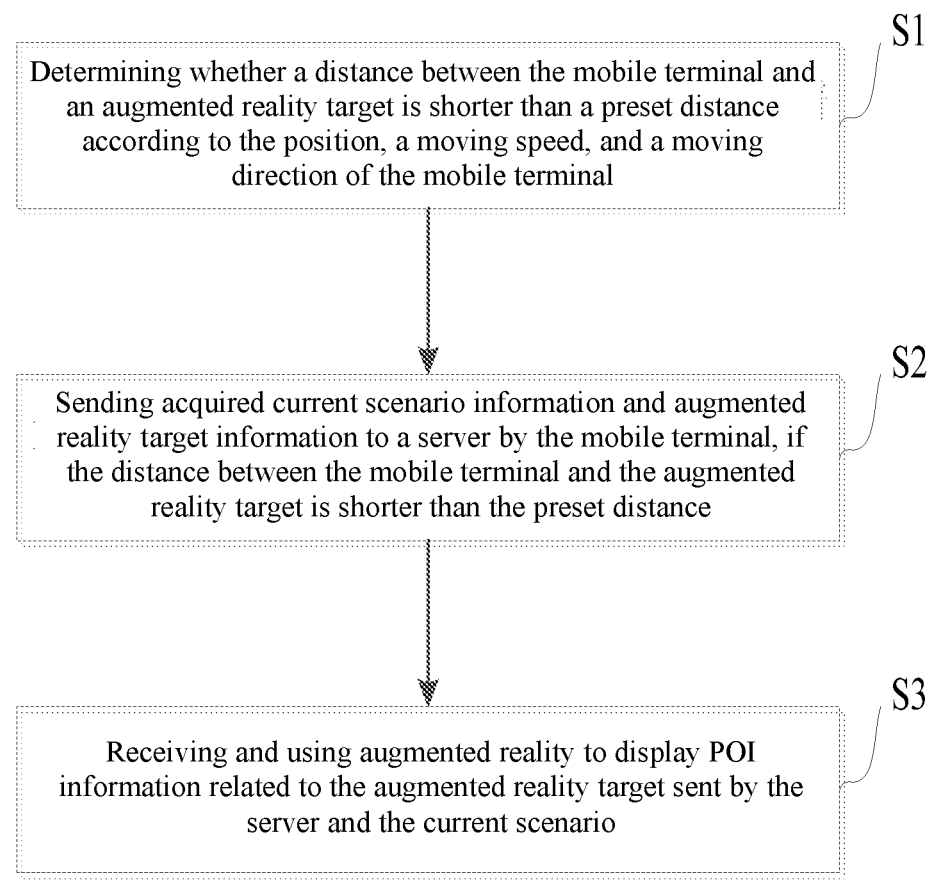
FIG. 2 is a flow chart of an embodiment of an augmented reality-based information acquiring method according to the present application.

Referring to FIG. 2, the method comprises:

S1. Determining whether a distance between the mobile terminal and an augmented reality target is shorter than a preset distance according to the position, a moving speed and a moving direction of the mobile terminal.

Specifically, the preset distance is preset by a person skilled in the art according to experience or preset by a user as needed.

Figure 3:
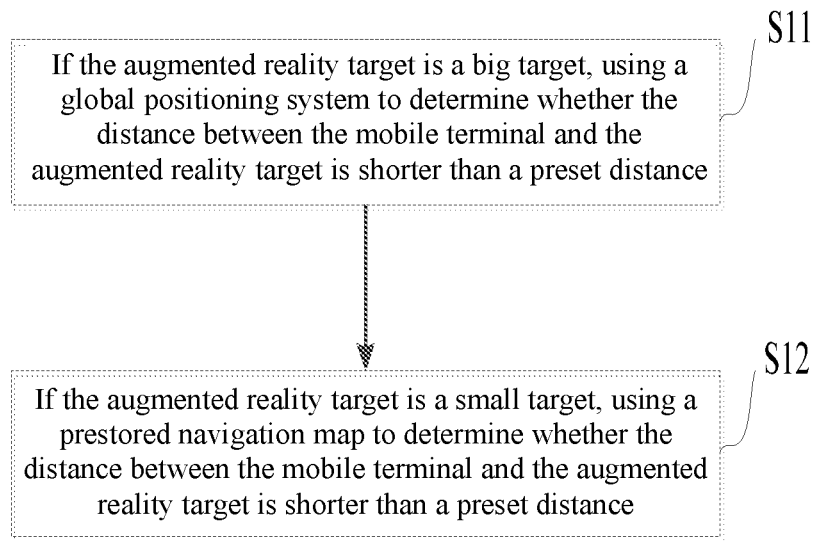
FIG. 3 is a flow chart of step S1 in another embodiment of an augmented reality-based information acquiring method according to the present application.

In a specific implementation of the present application, referring to FIG. 3, step S1 comprises:

S11. If the augmented reality target is a big target, using a global positioning system to determine whether the distance between the mobile terminal and the augmented reality target is shorter than a preset distance;

Specifically, when the augmented reality target is a big target, such as a restaurant, a hotel, a railway station, and the like, and the augmented reality target can be obtained through a global positioning system (GPS), GPS can be used to determine whether the distance between the mobile terminal and the augmented reality target is shorter than a preset distance according to the position, the moving speed, and the moving direction of the mobile terminal.

GPS path calculation methods can be referred to for details of such algorithm, which is in the prior art and will not be repeated herein.

S12 If the augmented reality target is a small target, using a prestored navigation map to determine whether the distance between the mobile terminal and the augmented reality target is shorter than a preset distance.

When the augmented reality target is a small target, such as a brand counter in a mall, a specific workpiece in an exhibition, and the like, whether the distance between the mobile terminal and the augmented reality target is shorter than a preset distance can be determined by using a prestored navigation map and according to the position, the moving speed, and the moving direction of the mobile terminal.

For example, by determining an initial position and the position of an augmented reality target, a navigation route can be determined according to a prestored navigation map. Whether the distance between the mobile terminal and the augmented reality target is shorter than a preset distance can be determined, through the navigation map and according to the navigation route, as well as the position, the moving speed and the moving direction of the mobile terminal.

Therefore, the present application can accurately calculate a distance between the mobile terminal and an augmented reality target when the augmented reality target is a big target, and moreover, can also accurately calculate a distance between the mobile terminal and an augmented reality target when the augmented reality target is a small target. Therefore, the present application can position any augmented reality target and determine a distance between the mobile terminal and the augmented reality target.

Figure 4:
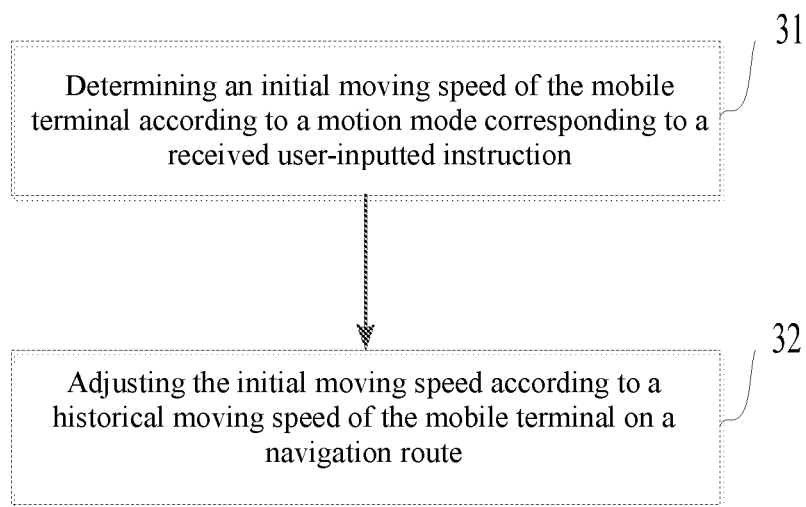
FIG. 4 is a flow chart of step S3 in yet another embodiment of an augmented reality-based information acquiring method according to the present application.

In another specific implementation of the present application, referring to FIG. 4, the step of acquiring the moving speed comprises:

31. Determining an initial moving speed of the mobile terminal according to a motion mode corresponding to a received user-inputted instruction.

Specifically, the user can input a user-inputted instruction through the input and output apparatus 13 of the mobile terminal (e.g., a touchscreen) to select a corresponding motion mode. The motion mode typically comprises walking, biking, and driving. Each motion mode corresponds to a different initial moving speed, and the initial moving speed can be a prestored default value or can be set by a user according to his/her typical speed.

Therefore, the present application can set different initial moving speeds according to different motion modes, thereby achieving accurate determination of a moving speed of the mobile terminal.

32. Adjusting the initial moving speed according to a historical moving speed of the mobile terminal on a navigation route.

Since different users in the same motion mode may have different moving speeds, the initial moving speed is adjusted according to a historical moving speed of the mobile terminal on a navigation route, which prevents the difference in moving speeds of users from affecting the accuracy of the moving speed and then affecting the calculation of a distance between the mobile terminal and an augmented reality target.

S2. Sending acquired current scenario information and augmented reality target information to a server by the mobile terminal, if the distance between the mobile terminal and the augmented reality target is shorter than the preset distance.

Figure 5:
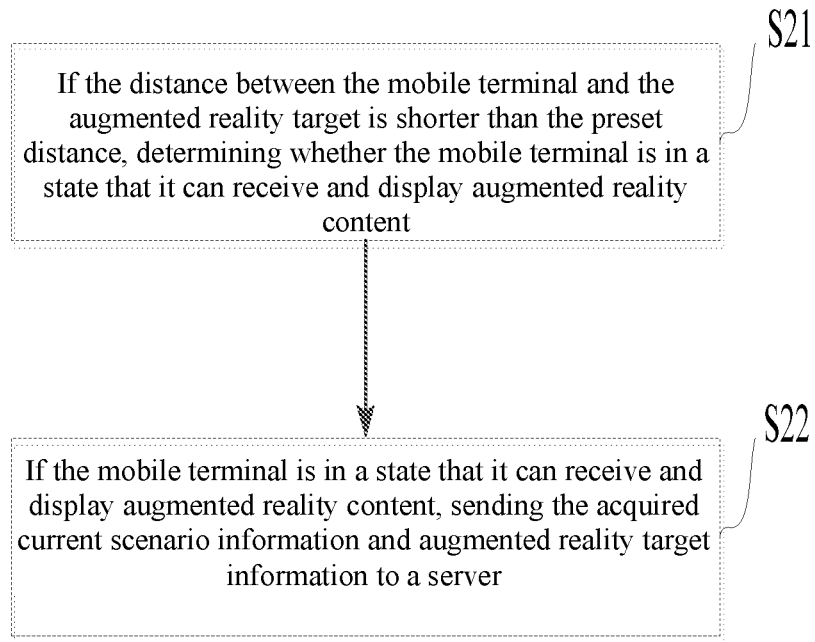
FIG. 5 is a flow chart of yet another embodiment of an augmented reality-based information acquiring method according to the present application.

In yet another specific implementation of the present application, referring to FIG. 5, the step S2 comprises:

S21. Determining whether the mobile terminal is in a state that it can receive and display augmented reality content if the distance between the mobile terminal and the augmented reality target is shorter than the preset distance.

There are many types of mobile terminals, which have different computational capabilities and settings. For example, some mobile terminals cannot perform rendered display of augmented reality, while some other mobile terminals cannot receive information pushed by the server.

If the mobile terminal is in a state that it cannot receive or display augmented reality content, an error message will be sent. Therefore, the present application determines whether the mobile terminal is in a state that it can receive and display augmented reality content.

S22. If the mobile terminal is in a state that it can receive and display augmented reality content, sending the acquired current scenario information and augmented reality target information to a server.

If the mobile terminal is in a state that it can receive and display augmented reality content, i.e., it can perform rendered display of augmented reality and can receive information pushed by the server, the mobile terminal sends the acquired current scenario information and augmented reality target information to the server.

Specifically, the scenario information comprises at least one of scenario positioning parameter information, scenario marking object information, scenario marking object images, and user images.

The augmented reality target information comprises at least one of position, number, and index number of the augmented reality target.

In yet another specific implementation of the present application, the step S22 further comprises:

further sending user demand information to the server, if the mobile terminal is in a state that it can receive and display augmented reality content.

For example, when the user demand is traveling, the traveling information is sent to the server, and the server pushes the traveling information.

S3. Receiving and using augmented reality to display POI information related to the augmented reality target sent by the server and the current scenario.

Figure 6:
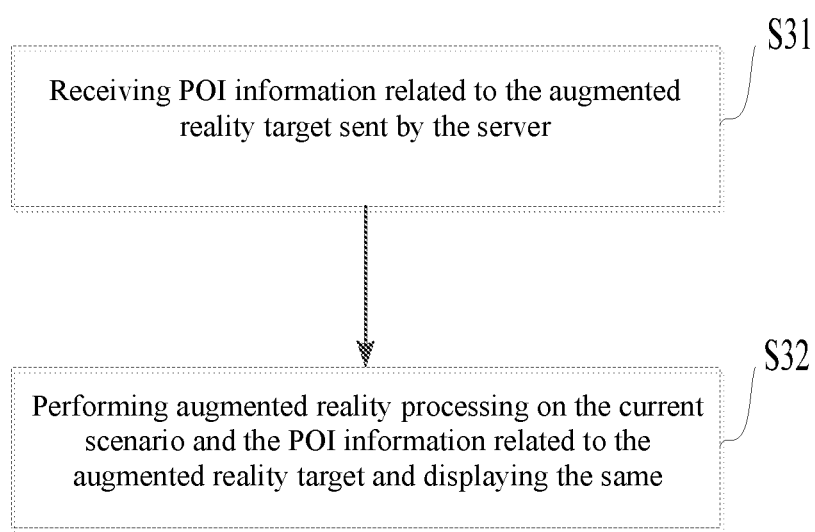
FIG. 6 is a schematic structural diagram of an embodiment of an augmented reality-based information acquiring apparatus according to the present application.

In yet another specific implementation of the present application, referring to FIG. 6, the step S3 comprises:

S31. Receiving POI information related to the augmented reality target sent by the server.

Specifically, the POI information comprises: promotional information corresponding to preference information acquired from historical behavior information of the user.

The POI information can be, illustratively, hotel reservation information, menus and prices of a restaurant, train timetables, shopping mall discount information, 3D drawings of an internal structure of a vehicle, and the like.

S32. Performing augmented reality processing on the current scenario and the POI information related to the augmented reality target and displaying the same.

Figure 7:
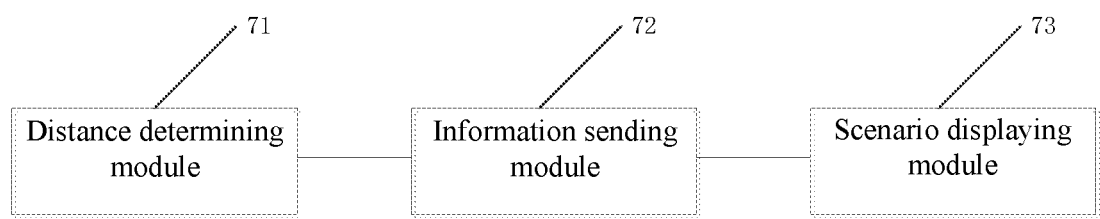
FIG. 7 is a schematic structural diagram of step S1 in another embodiment of an augmented reality-based information acquiring apparatus according to the present application.

Corresponding to the above method, referring to FIG. 7, the present application further provides an augmented reality-based information acquiring apparatus, wherein the apparatus is implemented in a mobile terminal and comprises:

a distance determining module 71 configured to determine whether a distance between the mobile terminal and an augmented reality target is shorter than a preset distance according to the position, a moving speed, and a moving direction of the mobile terminal;

an information sending module 72 configured to send acquired current scenario information and augmented reality target information to a server by the mobile terminal, if the distance between the mobile terminal and the augmented reality target is shorter than the preset distance; and a scenario displaying module 73 configured to receive and use augmented reality to display information of a point of interest related to the augmented reality target sent by the server and the current scenario.

Specifically, the preset distance is preset by a person skilled in the art according to experience or preset by a user as needed.

Figure 8:
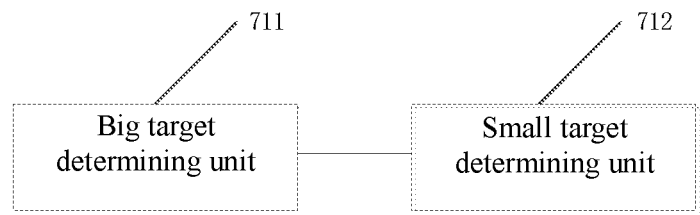
FIG. 8 is a schematic structural diagram of step S3 in yet another embodiment of an augmented reality-based information acquiring apparatus according to the present application.

In a specific implementation of the present application, referring to FIG. 8, the distance determining module 71 comprises:

a big target determining unit 711 configured to use a global positioning system to determine whether the distance between the mobile terminal and the augmented reality target is shorter than a preset distance, if the augmented reality target is a big target; and/or a small target determining unit 712 configured to use a prestored navigation map to determine whether the distance between the mobile terminal and the augmented reality target is shorter than a preset distance, if the augmented reality target is a small target.

Specifically, when the augmented reality target is a big target, such as a restaurant, a hotel, a railway station, and the like, and the augmented reality target can be obtained through a global positioning system (GPS), GPS can be used to determine whether the distance between the mobile terminal and the augmented reality target is shorter than a preset distance according to the position, the moving speed, and the moving direction of the mobile terminal.

GPS path calculation methods can be referred to for details of such algorithm, which is in the prior art and will not be repeated herein.

When the augmented reality target is a small target, such as a brand counter in a mall, a specific workpiece in an exhibition, and the like, whether the distance between the mobile terminal and the augmented reality target is shorter than a preset distance can be determined by using a prestored navigation map and according to the position, the moving speed, and the moving direction of the mobile terminal.

For example, by determining an initial position and the position of an augmented reality target, a navigation route can be determined according to a prestored navigation map. Whether the distance between the mobile terminal and the augmented reality target is shorter than a preset distance can be determined, through the navigation map and according to the navigation route, as well as the position, the moving speed, and the moving direction of the mobile terminal.

Therefore, the present application can accurately calculate a distance between the mobile terminal and an augmented reality target when the augmented reality target is a big target, and moreover, can also accurately calculate a distance between the mobile terminal and an augmented reality target when the augmented reality target is a small target. Therefore, the present application can position any augmented reality target and determine a distance between the mobile terminal and the augmented reality target.

In another specific implementation of the present application, referring to FIG. 3, the step of acquiring the moving speed comprises:

31. Determining an initial moving speed of the mobile terminal according to a motion mode corresponding to a received user-inputted instruction.

Specifically, the user can input a user-inputted instruction through the input and output apparatus 13 of the mobile terminal (e.g., a touchscreen) to select a corresponding motion mode. The motion mode typically comprises walking, biking, and driving. Each motion mode corresponds to a different initial moving speed, and the initial moving speed can be a prestored default value or can be set by a user according to his/her typical speed.

Therefore, the present application can set different initial moving speeds according to different motion modes, thereby achieving accurate determination of a moving speed of the mobile terminal.

32. Adjusting the initial moving speed according to a historical moving speed of the mobile terminal on a navigation route.

Since different users in the same motion mode may have different moving speeds, the initial moving speed is adjusted according to a historical moving speed of the mobile terminal on a navigation route, which prevents the difference in moving speeds of users from affecting the accuracy of the moving speed and then affecting the calculation of a distance between the mobile terminal and an augmented reality target.

Figure 9:
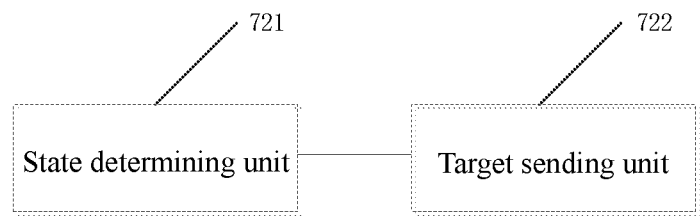
FIG. 9 is a schematic structural diagram of yet another embodiment of an augmented reality-based information acquiring apparatus according to the present application.

In yet another specific implementation of the present application, referring to FIG. 9, the information sending module 72 comprises:

a state determining unit 721 configured to determine whether the mobile terminal is in a state that it can receive and display augmented reality content, if the distance between the mobile terminal and the augmented reality target is shorter than the preset distance; and a target sending unit 722 configured to send the acquired current scenario information and augmented reality target information to a server, if the mobile terminal is in a state that it can receive and display augmented reality content.

There are many types of mobile terminals, which have different computational capabilities and settings. For example, some mobile terminals cannot perform rendered display of augmented reality, while some other mobile terminals cannot receive information pushed by the server.

If the mobile terminal is in a state that it cannot receive or display augmented reality content, an error message will be sent. Therefore, the present application determines whether the mobile terminal is in a state that it can receive and display augmented reality content.

If the mobile terminal is in a state that it can receive and display augmented reality content, i.e., it can perform rendered display of augmented reality and can receive information pushed by the server, the mobile terminal sends the acquired current scenario information and augmented reality target information to the server.

Specifically, the scenario information comprises at least one of scenario positioning parameter information, scenario marking object information, scenario marking object images, and user images.

The augmented reality target information comprises at least one of position, number, and index number of the augmented reality target.

In yet another specific implementation of the present application, the target sending unit 722 is further configured to further send user demand information to the server, if the mobile terminal is in a state that it can receive and display augmented reality content.

For example, when the user demand is traveling, the traveling information is sent to the server, and the server pushes the traveling information.

Figure 10:
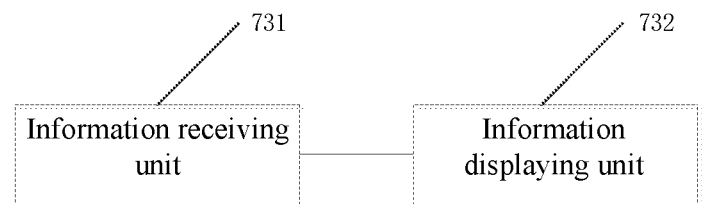
FIG. 10 is a flow chart of a specific application scenario of an embodiment of the present application.

In yet another specific implementation of the present application, referring to FIG. 10, the scenario displaying module 73 comprises:

an information receiving unit 731 configured to receive POI information related to the augmented reality target sent by the server; and an information displaying unit 732 configured to perform augmented reality processing on the current scenario and the POI information related to the augmented reality target and display the same.

Specifically, the POI information comprises: promotional information corresponding to preference information acquired from historical behavior information of the user.

The POI information can be, illustratively, hotel reservation information, menus and prices of a restaurant, train timetables, shopping mall discount information, 3D drawings of an internal structure of a vehicle, and the like.

Figure 11:
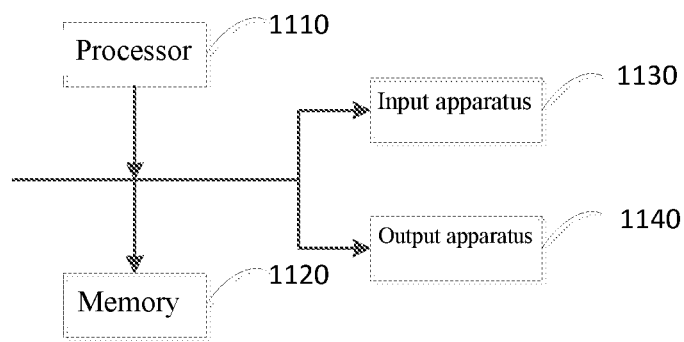
FIG. 11 is a schematic hardware structural diagram of an electronic device according to an embodiment of the present application.

FIG. 11 is a schematic hardware structural diagram of an electronic device of the augmented reality-based information acquiring method according to an embodiment of the present application. As shown in FIG. 11, the device comprises:

one or more processors 1110 and memories 1120, and the example in FIG. 11 has one processor 1110.

The electronic device for executing the augmented reality-based information acquiring method can further comprise an input apparatus 1130 and an output apparatus 1140.

The processors 1110, memories 1120, input apparatus 1130 and output apparatus 1140 can be connected via a bus or in other manners, and the example in FIG. 11 has a bus connection.

As a non-volatile computer readable storage medium, the memory 1120 can be used to store non-volatile software programs, non-volatile computer executable programs and modules, such as program instructions/modules corresponding to the augmented reality-based information acquiring method in the embodiments of the present application (e.g., the distance determining module 71, the information sending module 72, and the scenario displaying module 73 shown in FIG. 7). By running the non-volatile software programs, instructions, and modules stored in the memory 1120, the processor 1110 executes various functional applications and data processing of a server, i.e., implementing the augmented reality-based information acquiring method in the above method embodiments.

The memory 1120 can comprise a stored program region and a stored data region, wherein the stored program region can store an operating system and application programs required by at least one function; the stored data region can store data created by the use of an augmented reality-based information acquiring electronic device. In addition, the memory 1120 can comprise a High-Speed Dynamic Random-Access Memory or can further comprise a non-volatile memory, for example, at least one magnetic disk storage device, a flash memory device, or other non-volatile solid-state memory. In some embodiments, the memory 1120 optionally comprises memories configured remotely relative to the processor 1110. These remote memories can be connected, via a network, to an augmented reality-based information acquiring processing apparatus. Examples of the above network include, but are not limited to, the Internet, enterprise intranets, local area networks, mobile communication networks, and a combination thereof.

The input apparatus 1130 can receive inputted numerical or character information and generate user settings for an augmented reality-based information acquiring electronic device and key signal inputs related to function control. The output apparatus 1140 can comprise a display device, such as a display screen.

The one or more modules are stored in the memory 1120, and when executed by the one or more processors 1110, execute the augmented reality-based information acquiring method in any one of the above method embodiments.

The above product can execute the method according to the embodiments of the present application and comprises functional modules and have advantageous effects corresponding to the executed method. The method according to the embodiments of the present application can be referred to for any technical detail that has not been described in detail in the embodiments.

The electronic device according to the embodiments of the present application can exist in a variety of forms, including but not limited to:

(1) Mobile communication devices: this type of device is characterized by having mobile communication capabilities and having a main goal of providing voice and data communications. This type of devices comprises smart phones (e.g., iPhone), multimedia cell phones, functional cell phones, and low-end cell phones.

(2) Super mobile computer devices: this type of device falls into the category of personal computer having computational and processing functions, and typically having mobile Internet access features. This type of terminals comprises PDA, MID, UMPC devices, and the like, e.g., iPad.

(3) Portable entertainment devices: this type of device can display and broadcast multimedia content. This type of terminals comprises audio, video player (e.g., iPod), handheld game devices, e-books, smart toys, and portable vehicle-mounted navigation devices.

(4) Servers: devices that provide computational services. The composition of a server comprises a processor, a hard drive, a memory, a system bus, and the like. A server has a similar architecture as that of a general-purpose computer, but have high requirements in aspects, such as processing capability, stability, reliability, safety, scalability, and manageability, due to the need for providing highly reliable services.

(5) Other electronic devices having data interaction capabilities.

The implementation of an embodiment of the present application will be further described below through a specific application scenario of an embodiment of the present application.

Figure 12:
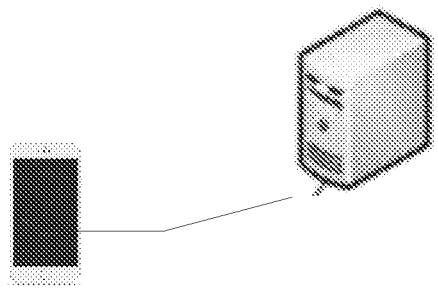
FIG. 12 illustrates an embodiment of the present application applied to a mobile terminal.

Referring to FIG. 12, an embodiment of the present application is applied to a mobile terminal, and the mobile terminal is connected to a server via a network and achieves augmented reality-based information acquisition by using the embodiment of the present application.

Figure 13:
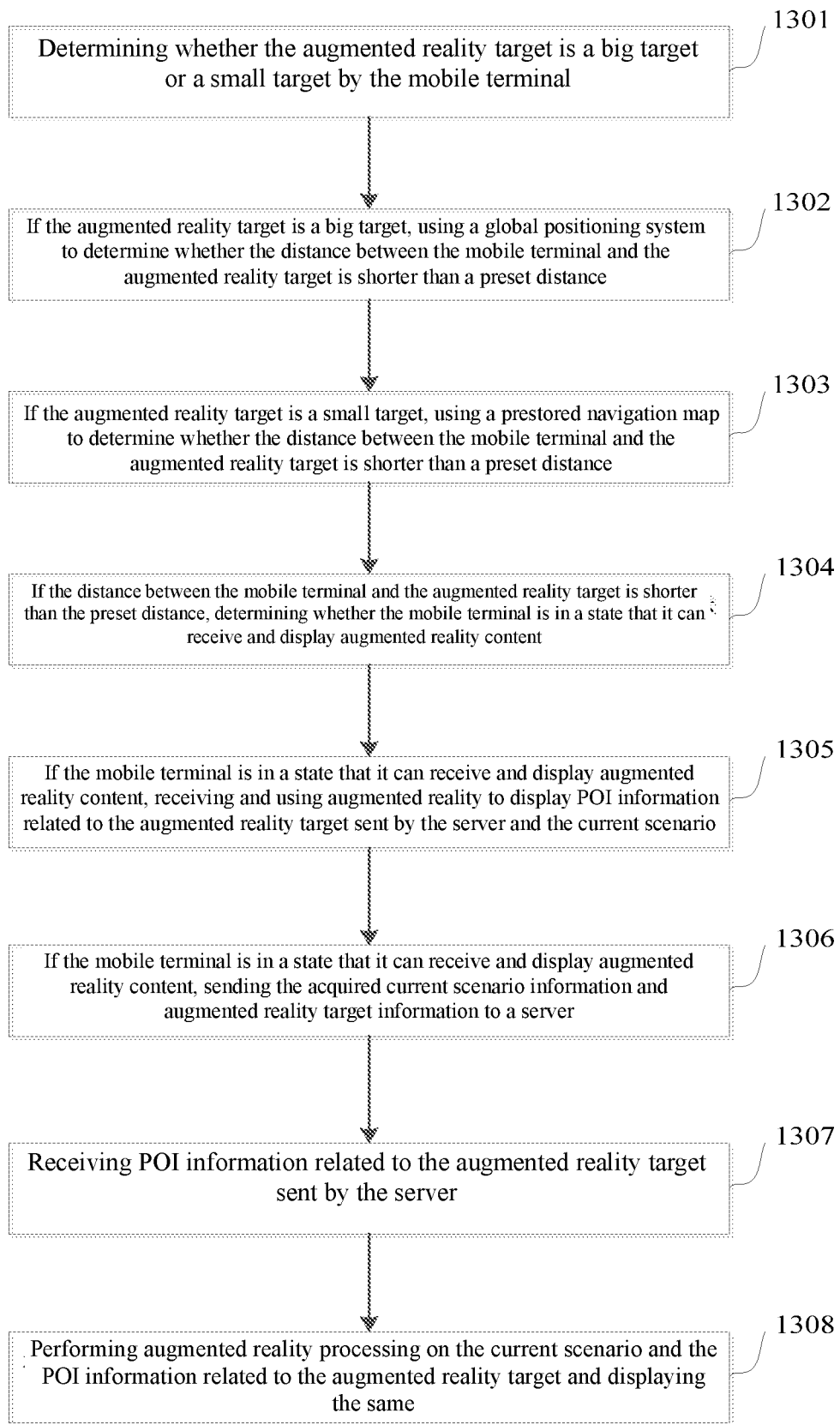
FIG. 13 is a flow chart according to an embodiment of the present application.

Referring to FIG. 13, the method comprises:

1301. Determining, by the mobile terminal, whether the augmented reality target is a big target or a small target.

1302. If the augmented reality target is a big target, using a global positioning system to determine whether the distance between the mobile terminal and the augmented reality target is shorter than a preset distance.

1303. If the augmented reality target is a small target, using a prestored navigation map to determine whether the distance between the mobile terminal and the augmented reality target is shorter than a preset distance.

1304. If the distance between the mobile terminal and the augmented reality target is shorter than the preset distance, determining whether the mobile terminal is in a state that it can receive and display augmented reality content.

1305. If the mobile terminal is in a state that it can receive and display augmented reality content, receiving and using augmented reality to display POI information related to the augmented reality target sent by the server and the current scenario.

1306. If the mobile terminal is in a state that it can receive and display augmented reality content, sending the acquired current scenario information and augmented reality target information to a server.

1307. Receiving POI information related to the augmented reality target sent by the server.

1308. Performing augmented reality processing on the current scenario and the POI information related to the augmented reality target and displaying the same.

A person skilled in the art should understand that the embodiments of the present application may be provided as a method, an apparatus (device), or a computer program product. Therefore, the present application may be implemented in the form of a complete hardware embodiment, a complete software embodiment, or an embodiment combing software and hardware. Moreover, the embodiments of the present application may be in the form of a computer program product implemented on one or more computer usable storage media (including, but not limited to, a magnetic disk memory, CD-ROM, an optical memory, and the like) comprising computer usable program codes therein.

The present application is described with reference to flow charts and/or block diagrams of the method, apparatus (device) and computer program product according to the embodiments. It should be understood that a computer program instruction may be used to implement each process and/or block in the flow charts and/or block diagrams and a combination of processes and/or blocks in the flow charts and/or block diagrams. These computer program instructions may be provided for a general-purpose computer, a special-purpose computer, an embedded processor, or a processor of other programmable data processing devices to generate a machine, so that the instructions executed by a computer or a processor of other programmable data processing devices generate an apparatus for implementing a specified function in one or more processes in the flow charts and/or in one or more blocks in the block diagrams.

These computer program instructions may also be stored in a computer readable memory that can instruct a computer or other programmable data processing devices to work in a particular manner, such that the instructions stored in the computer readable memory generate a manufactured article that includes an instruction apparatus. The instruction apparatus implements a specified function in one or more processes in the flow charts and/or in one or more blocks in the block diagrams.

These computer program instructions may also be loaded onto a computer or other programmable data processing devices, such that a series of operational steps are executed on the computer or other programmable devices to generate computer-implemented processing. Therefore, the instructions executed on the computer or other programmable devices provide steps for implementing a specified function in one or more processes in the flow charts and/or in one or more blocks in the block diagrams.

The preferred embodiments of the present application have been described; however, a person skilled in the art can make additional changes and amendments to these embodiments once learning the basic innovative concept. Therefore, the appended claims are intended to encompass the preferred embodiments and all changes and amendments falling in the scope of the present application. Apparently, a person skilled in the art can make various modifications and variations to the embodiments of the present application without departing from the spirit and scope of the present application. If these modifications and variations to the embodiments of the present application fall within the scope of the claims of the embodiments of the present application and the equivalent technologies thereof, the present application will also intend to encompass these modifications and variations.

The invention claimed is:

1. An augmented reality based information acquiring method, wherein the method is applied to a mobile terminal and comprises:
   determining whether a distance between the mobile terminal and an augmented reality target is shorter than a preset distance according to a position, a moving speed and a moving direction of the mobile terminal, comprising:
      determining an initial moving speed of the mobile terminal according to a motion mode corresponding to a received user-inputted instruction; and
      adjusting the initial moving speed according to a historical moving speed of the mobile terminal on a navigation route;
   sending acquired current scenario information and augmented reality target information to a server by the mobile terminal, based on determining that the distance between the mobile terminal and the augmented reality target is shorter than the preset distance; and
   receiving and using augmented reality to display information of a point of interest related to the augmented reality target sent by the server and the current scenario.

2. The method according to claim 1, wherein determining whether the distance between the mobile terminal and the augmented reality target is shorter than the preset distance according to the position, the moving speed and the moving direction of the mobile terminal comprises:
   determining that the augmented reality target is a big target; and
   using a global positioning system to determine whether the distance between the mobile terminal and the augmented reality target is shorter than the preset distance.

3. The method according to claim 1, wherein sending the acquired current scenario information and augmented reality target information to the server by the mobile terminal, based on determining that the distance between the mobile terminal and the augmented reality target is shorter than the preset distance, comprises:
   based on determining that the distance between the mobile terminal and the augmented reality target is shorter than the preset distance, determining whether the mobile terminal is in a state that it can receive and display augmented reality content; and
   based on determining that the mobile terminal is in the state that it can receive and display the augmented reality content, sending the acquired current scenario information and augmented reality target information to the server.

4. The method according to claim 3, wherein based on determining that the mobile terminal is in the state that it can receive and display the augmented reality content, sending the acquired current scenario information and augmented reality target information to the server further comprises:

based on determining that the mobile terminal is in the state that it can receive and display the augmented reality content, sending user demand information to the server.

5. The method according to claim 4, wherein the acquired current scenario information comprises at least one of scenario positioning parameter information, scenario marking object information, scenario marking object images, and user images.

6. The method according to claim 1 wherein receiving and using augmented reality to display information of the point of interest related to the augmented reality target sent by the server and the current scenario comprises:
receiving information of the point of interest related to the augmented reality target sent by the server; and
performing augmented reality processing on the current scenario and the information of the point of interest related to the augmented reality target and displaying the same.

7. The method according to claim 6, wherein the information of the point of interest comprises: promotional information corresponding to preference information acquired from historical behavior information of the user.

8. An augmented reality-based information acquiring apparatus, wherein the apparatus is implemented in a mobile terminal and comprises:
a distance determining module configured to determine whether a distance between the mobile terminal and an augmented reality target is shorter than a preset distance according to a position, a moving speed and a moving direction of the mobile terminal, wherein the distance determining module is configured to:
determine an initial moving speed of the mobile terminal according to a motion mode corresponding to a received user-inputted instruction, and
adjust the initial moving speed according to a historical moving speed of the mobile terminal on a navigation route;
an information sending module configured to send acquired current scenario information and augmented reality target information to a server by the mobile terminal, if the distance between the mobile terminal and the augmented reality target is shorter than the preset distance; and
a scenario displaying module configured to receive and use augmented reality to display information of a point of interest related to the augmented reality target sent by the server and the current scenario.

9. The apparatus according to claim 8, wherein the distance determining module comprises:
a big target determining unit configured to use a global positioning system, if the augmented reality target is a big target, to determine whether the distance between the mobile terminal and the augmented reality target is shorter than the preset distance; and a small target determining unit configured to use a prestored navigation map, if the augmented reality target is a small target, to determine whether the distance between the mobile terminal and the augmented reality target is shorter than the preset distance.

10. The apparatus according to claim 8, wherein the information sending module comprises:
a state determining unit configured to determine whether the mobile terminal is in a state that it can receive and display augmented reality content, if the distance between the mobile terminal and the augmented reality target is shorter than the preset distance; and
a target sending unit configured to send the acquired current scenario information and augmented reality target information to the server, if the mobile terminal is in the state that it can receive and display the augmented reality content.

11. The apparatus according to claim 10, wherein the target sending unit further comprises:
a demand sending unit configured to send user demand information to the server, if the mobile terminal is in the state that it can receive and display the augmented reality content.

12. The apparatus according to claim 11, wherein the acquired current scenario information comprises at least one of scenario positioning parameter information, scenario marking object information, scenario marking object images, and user images.

13. The apparatus according to claim 8, wherein the scenario displaying module comprises:
an information receiving unit configured to receive information of the point of interest related to the augmented reality target sent by the server; and
an information displaying unit configured to perform augmented reality processing on the current scenario and the information of the point of interest related to the augmented reality target and display the same.

14. The apparatus according to claim 13, wherein the information of the point of interest comprises: promotional information corresponding to preference information acquired from historical behavior information of the user.

15. The method according to claim 1, wherein determining whether the distance between the mobile terminal and the augmented reality target is shorter than the preset distance according to the position, the moving speed and the moving direction of the mobile terminal comprises:
determining that the augmented reality target is a small target; and
using a prestored navigation map to determine whether the distance between the mobile terminal and the augmented reality target is shorter than the preset distance.

* * * * *